(12) United States Patent
Kuriyama et al.

(10) Patent No.: US 11,884,108 B2
(45) Date of Patent: Jan. 30, 2024

(54) TIRE

(71) Applicant: Sumitomo Rubber Industries, Ltd., Kobe (JP)

(72) Inventors: Tomohisa Kuriyama, Kobe (JP); Ryota Ikeda, Kobe (JP); Daichi Takatsuki, Kobe (JP); Kohei Miyoshi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/839,505

(22) Filed: Jun. 14, 2022

(65) Prior Publication Data

US 2022/0396099 A1    Dec. 15, 2022

(30) Foreign Application Priority Data

Jun. 15, 2021   (JP) .................................. 2021-099592
Feb. 28, 2022   (JP) .................................. 2022-029741

(51) Int. Cl.
*B60C 11/12*    (2006.01)
*B60C 11/03*    (2006.01)

(52) U.S. Cl.
CPC ...... *B60C 11/1259* (2013.01); *B60C 11/0302* (2013.01); *B60C 2011/0341* (2013.01); *B60C 2011/0365* (2013.01)

(58) Field of Classification Search
CPC .. B60C 11/12; B60C 11/1204; B60C 11/0304
See application file for complete search history.

(56) References Cited

U.S. PATENT DOCUMENTS 2,186,180 A  *  1/1940  Sloman ................... B60C 11/12
                                                            152/DIG. 3
2013/0087261 A1    4/2013  Kageyama
2014/0305559 A1   10/2014  Takemoto
(Continued)

FOREIGN PATENT DOCUMENTS

JP          6562130 B2  *  8/2019 ......... B60C 11/1236
JP     2019167051 A   * 10/2019

OTHER PUBLICATIONS

Extended European search report dated Oct. 25, 2022, in corresponding European patent Application No. 22176374.1, 17 pages.

*Primary Examiner* — Cedrick S Williams
(74) *Attorney, Agent, or Firm* — XSENSUS LLP

(57) ABSTRACT

A tire that includes a tread portion having a designated mounting direction to a vehicle can comprise: an outer shoulder land portion having a greatest width, in the tire axial direction, of a ground contact surface among five land portions. The outer shoulder land portion can include a plurality of outer shoulder sipes connected to an outer shoulder circumferential groove. An outer middle land portion can include a plurality of outer middle sipes extending completely across the outer middle land portion in the tire axial direction. The outer shoulder sipes and the outer middle sipes each can include a pair of sipe walls. The outer shoulder sipes and the outer middle sipes can each include a body portion in which the pair of sipe walls are disposed substantially parallel to each other. A width of a body portion of each outer shoulder sipe can be greater than a width of a body portion of each outer middle sipe.

18 Claims, 11 Drawing Sheets

(56) References Cited

U.S. PATENT DOCUMENTS

| | | | |
|---|---|---|---|
| 2017/0100965 A1* | 4/2017 | Kikuchi | B60C 11/1263 |
| 2017/0210175 A1 | 7/2017 | Yoshimura | |
| 2018/0009269 A1* | 1/2018 | Kawagoe | B60C 11/1236 |
| 2018/0015787 A1 | 1/2018 | Hayashi | |
| 2018/0072105 A1 | 3/2018 | Wakasugi | |
| 2018/0162171 A1* | 6/2018 | Colletti | B60C 11/1392 |
| 2018/0170114 A1* | 6/2018 | Hayashi | B60C 11/12 |
| 2019/0375244 A1 | 12/2019 | Kubo | |
| 2020/0238766 A1 | 7/2020 | Hamaoka | |
| 2021/0107318 A1* | 4/2021 | Speziari | B60C 11/033 |

* cited by examiner

TIRE

CROSS-REFERENCE TO RELATED APPLICATIONS

The present application claims priority to Japanese patent applications JP 2021-099592, filed on Jun. 15, 2021, and JP 2022-029741, filed on Feb. 28, 2022, the entire contents of each of which are incorporated herein by reference in their entirety.

BACKGROUND

Technical Field

The present disclosure relates to a tire.

Background Art

Japanese Laid-Open Patent Publication No. 2018-158730 suggests a pneumatic tire in which an inner middle land portion and an outer middle land portion each include a plurality of middle lateral sipes. According to the document, the pneumatic tire is expected to enhance steering stability and noise performance by defining pitch intervals for the middle lateral sipes.

In recent years, according to enhancement of vehicle performance and output, tires have been required to further enhance steering stability. Meanwhile, tires may be required to enhance noise performance. Particularly in Europe, the exterior noise regulation is strictly defined, and tires are required to comply with the regulation.

The present disclosure has been made in view of the aforementioned circumstances.

SUMMARY

The present disclosure is directed to a tire that can include a tread portion having a designated mounting direction to a vehicle. The tread portion can include an outer tread end located on an outer side of the vehicle when the tire is mounted to the vehicle, an inner tread end located on an inner side of the vehicle when the tire is mounted to the vehicle, four circumferential grooves extending continuously in a tire circumferential direction between the outer tread end and the inner tread end, and five land portions demarcated by the four circumferential grooves. The four circumferential grooves can include an outer shoulder circumferential groove closest to the outer tread end when the tire is mounted to the vehicle. The five land portions can include an outer shoulder land portion including the outer tread end, and an outer middle land portion adjacent to the outer shoulder land portion via the outer shoulder circumferential groove. The outer shoulder land portion can have a greatest width, in a tire axial direction, of a ground contact surface among the five land portions. The outer shoulder land portion can include a plurality of outer shoulder sipes connected to the outer shoulder circumferential groove. The outer middle land portion can include a plurality of outer middle sipes connected to the outer shoulder circumferential groove. Each of the outer shoulder sipes and the outer middle sipes can include a pair of sipe walls. Each of the outer shoulder sipes and the outer middle sipes can include a body portion in which the pair of sipe walls are disposed substantially parallel to each other. A width of the body portion of each outer shoulder sipe can be greater than a width of the body portion of each outer middle sipe.

DETAILED DESCRIPTION

Figure 1:
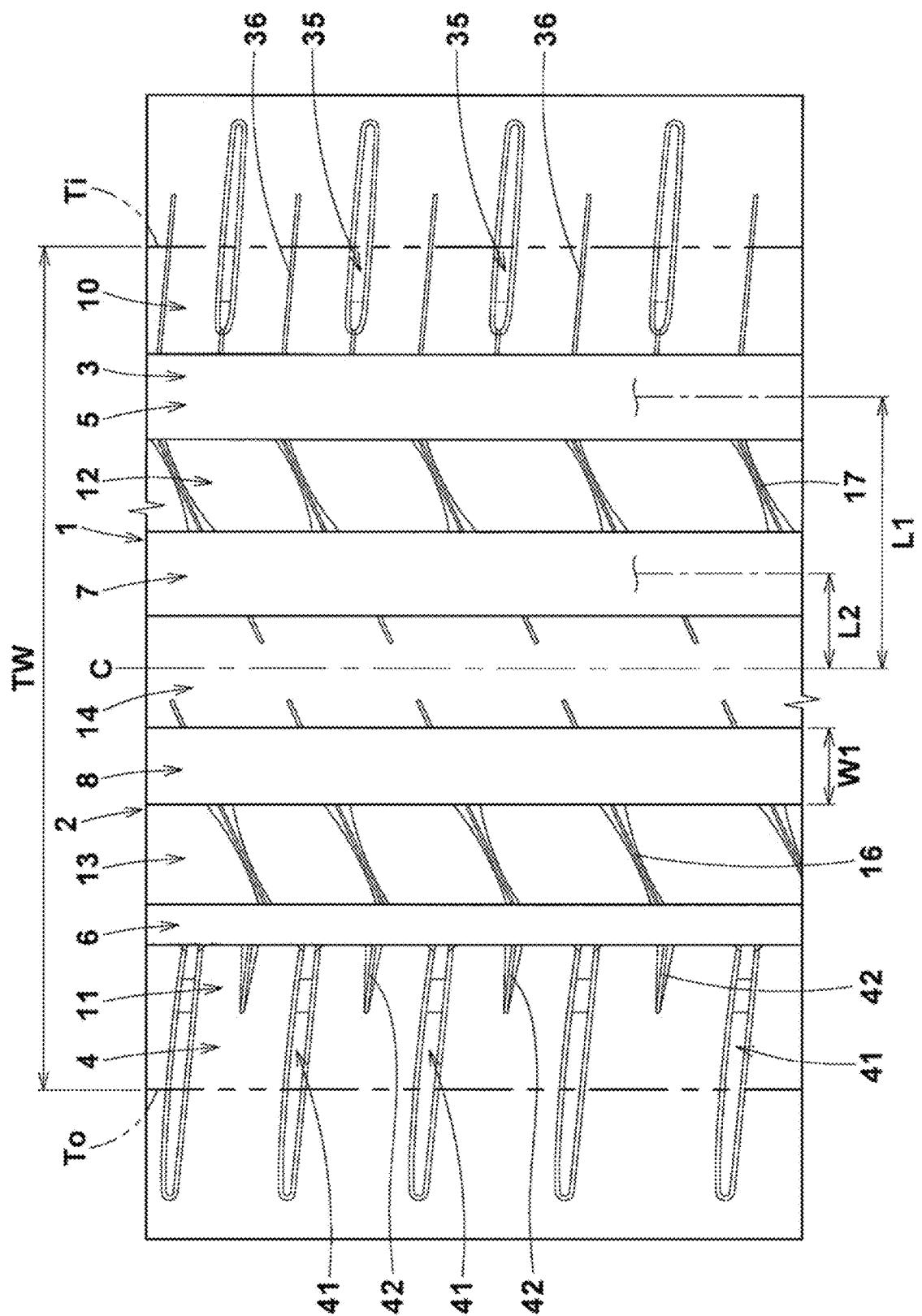
FIG. 1 is a development of a tread portion according to one embodiment of the present disclosure.

One embodiment of the present disclosure will be described below with reference to the drawings. FIG. 1 is a development of a tread portion 2 of a tire 1 according to one embodiment of the present disclosure. The tire 1 of the present embodiment may be used as, for example, a pneumatic tire for a passenger car. However, the present disclosure is not limited thereto, and may be applied to a heavy-duty pneumatic tire or a non-pneumatic tire the inside of which is not filled with pressurized air.

As shown in FIG. 1, in the present disclosure, the tread portion 2 can include four circumferential grooves 3 that extend continuously in the tire circumferential direction between two tread ends, and five land portions 4 demarcated by the four circumferential grooves 3. That is, the tire 1 of the present disclosure can be a so-called 5-rib tire in which the tread portion 2 includes the five land portions 4.

In the present disclosure, the tread portion 2 can have a designated mounting direction to a vehicle. Thus, the two tread ends can include an inner tread end Ti located on the inner side of a vehicle when the tire 1 is mounted to the vehicle, and an outer tread end To located on the outer side of the vehicle when the tire 1 is mounted to the vehicle. The mounting direction to a vehicle may be indicated, for example, on a sidewall portion by characters or a symbol.

The inner tread end Ti and the outer tread end To can each correspond to the outermost ground contact position in the tire axial direction in a state where a normal load is applied to the tire 1 in a normal state and the tire 1 is in contact with a plane at a camber angle of 0°.

The "normal state" can represent or be characterized as a state in which a tire is mounted on a normal rim and is inflated to a normal internal pressure and no load is applied to the tire, in a case where the tire is a pneumatic tire for which various standards are defined. For non-pneumatic tires and tires for which various standards are not defined, the normal state can represent or be characterized as a standard use state, corresponding to a purpose of use of the tire, in which the tire is not mounted to a vehicle and no load is applied to the tire. In the description herein, unless otherwise specified, dimensions and the like of components of the tire are represented as values measured in the normal state.

The "normal rim" can represent or be characterized as a rim that is defined by a standard, in a standard system including the standard on which the tire is based, for each tire, and is, for example, "standard rim" in the JATMA standard, "Design Rim" in the TRA standard, or "Measuring Rim" in the ETRTO standard.

The "normal internal pressure" can represent or be characterized as an air pressure that is defined by a standard, in a standard system including the standard on which the tire is based, for each tire, and is "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "normal load" can represent or be characterized as a load that is defined by a standard, in a standard system including the standard on which the tire is based, for each tire, and is "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard, for the pneumatic tires for which various standards are defined. For non-pneumatic tires and tires for which various standards are not defined, the "normal load" can represent or be characterized as a load that acts on one tire in a standard mounting state of the tire. The "standard mounting state" can represent or be characterized as a state in which a tire is mounted to a standard vehicle corresponding to the purpose of use of the tire and the vehicle is stationary on a flat road surface in a state where the vehicle can run.

The four circumferential grooves 3 can include an outer shoulder circumferential groove 6 located closest to the outer tread end To. In the present embodiment, the four circumferential grooves 3 can also include an inner shoulder circumferential groove 5, an outer crown circumferential groove 8, and an inner crown circumferential groove 7. The inner shoulder circumferential groove 5 can be located closest to the inner tread end Ti. The outer crown circumferential groove 8 can be between the outer shoulder circumferential groove 6 and the tire equator C. The inner crown circumferential groove 7 can be between the inner shoulder circumferential groove 5 and the tire equator C.

A distance L1 in the tire axial direction from the tire equator C to a groove center line of the outer shoulder circumferential groove 6 or the inner shoulder circumferential groove 5 can be, for example, 25% to 35% of a tread width TW. A distance L2 in the tire axial direction from the tire equator C to a groove center line of the outer crown circumferential groove 8 or the inner crown circumferential groove 7 can be, for example, 5% to 15% of the tread width TW. The tread width TW can represent or be characterized as a distance in the tire axial direction from the inner tread end Ti to the outer tread end To in the normal state.

In the present embodiment, for example, each circumferential groove 3 can linearly extend so as to be parallel to the tire circumferential direction. Each circumferential groove 3 may extend, for example, in a wavy manner.

A groove width W1 of each circumferential groove 3 can be at least 3 mm, for instance. The groove width W1 of each circumferential groove 3 can be, for example, 2.0% to 8.0% of the tread width TW. In the present embodiment, the outer shoulder circumferential groove 6 may have the smallest groove width among the four circumferential grooves 3. However, the present disclosure is not limited thereto. A depth of each circumferential groove 3 can be, for example, 5 to 10 mm in a case where the tire 1 is a pneumatic tire for a passenger car.

In the present disclosure, the five land portions 4 can include an outer shoulder land portion 11 and an outer middle land portion 13. The outer shoulder land portion 11 can be outward of the outer shoulder circumferential groove 6 in the tire axial direction and includes the outer tread end To. The outer middle land portion 13 can be adjacent to the outer shoulder land portion 11 via the outer shoulder circumferential groove 6. Furthermore, in the present embodiment, the five land portions 4 can include an inner shoulder land portion 10, an inner middle land portion 12, and a crown land portion 14. The inner shoulder land portion 10 can be outward of the inner shoulder circumferential groove 5 in the tire axial direction and can include the inner tread end Ti. The inner middle land portion 12 can be adjacent to the inner shoulder land portion 10 via the inner shoulder circumferential groove 5. The crown land portion 14 may be demarcated between the outer crown circumferential groove 8 and the inner crown circumferential groove 7.

Figure 2:
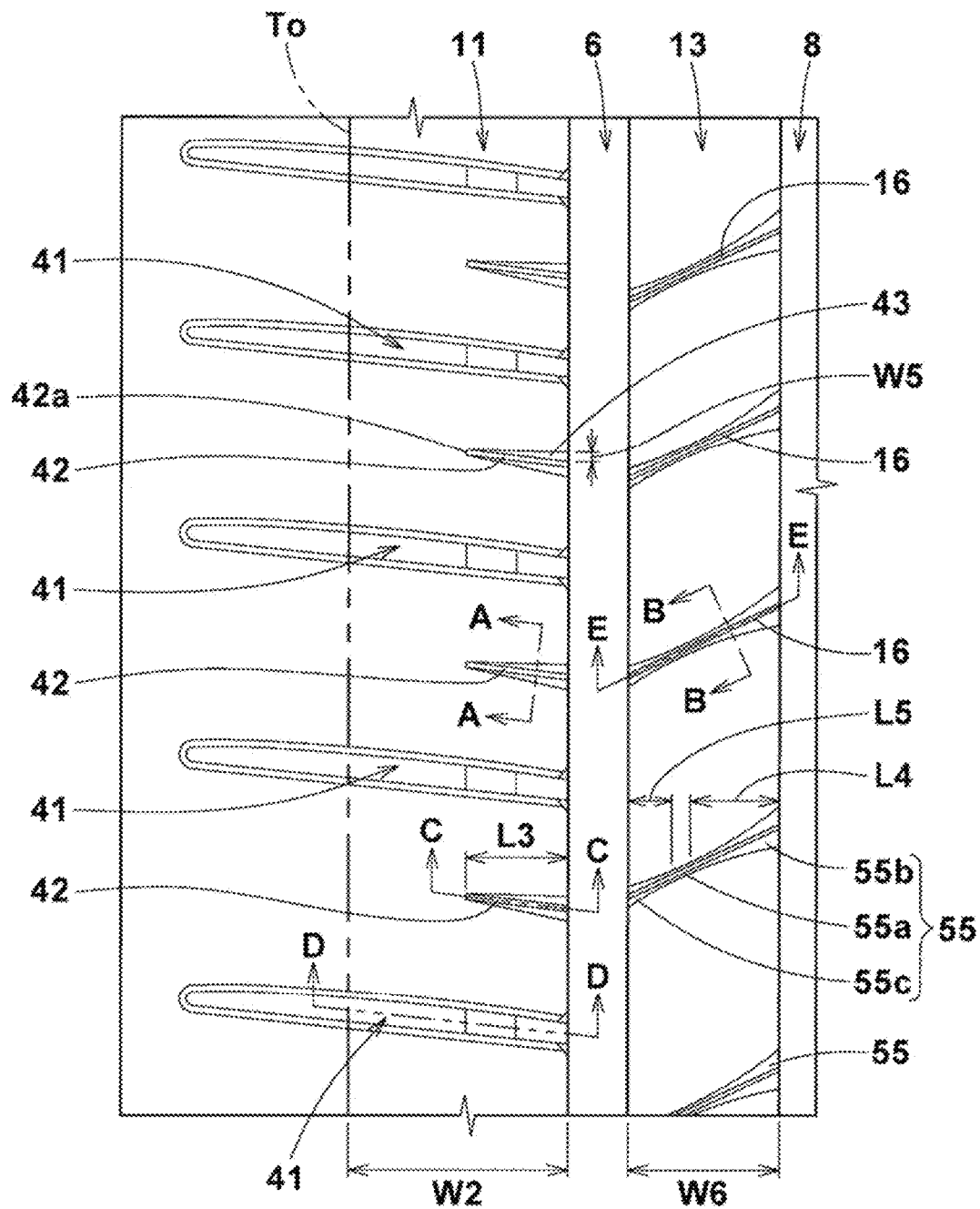
FIG. 2 is an enlarged view of an outer shoulder land portion and an outer middle land portion of the tread portion in FIG. 1.

FIG. 2 is an enlarged view of the outer shoulder land portion 11 and the outer middle land portion 13. As shown in FIG. 2, in the present disclosure, the outer shoulder land portion 11 can have the greatest width, in the tire axial direction, of a ground contact surface among the five land portions 4. In the present embodiment, a width W2, in the tire axial direction, of the ground contact surface of the outer shoulder land portion 11 can be, for example, 15% to 25% of the tread width TW, such as 15% to 20% thereof.

The outer shoulder land portion 11 can include a plurality of outer shoulder sipes 42 connected to the outer shoulder circumferential groove 6. The outer middle land portion 13 can include a plurality of outer middle sipes 16 connected to the outer shoulder circumferential groove 6.

Figure 3:
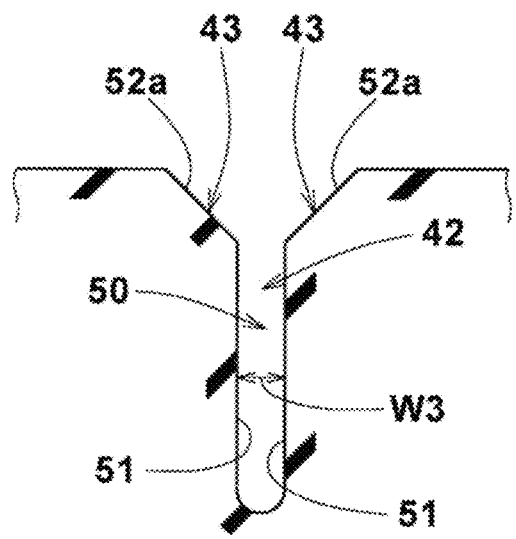
FIG. 3 is a cross-sectional view taken along a line A-A in FIG. 2.
Figure 4:
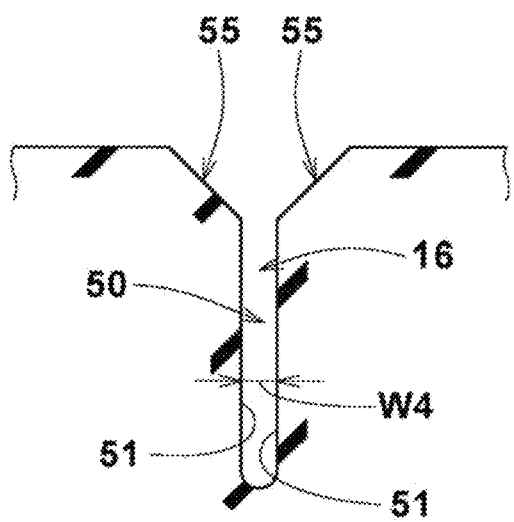
FIG. 4 is a cross-sectional view taken along a line B-B in FIG. 2.

FIG. 3 is a cross-sectional view of the outer shoulder sipe 42 in FIG. 2 as taken along a line A-A. FIG. 4 is a cross-sectional view of the outer middle sipe 16 in FIG. 2 as taken along a line B-B. As shown in FIG. 3 and FIG. 4, each of the outer shoulder sipe 42 and the outer middle sipe 16 can have a pair of sipe walls 51. Each of the outer shoulder sipe 42 and the outer middle sipe 16 can include a body portion 50 in which the pair of sipe walls 51 can be substantially parallel to each other. "Disposed substantially parallel to each other" not only may mean that the pair of sipe walls 51 extend completely parallel to each other but also may mean that an angle between the sipe walls 51 can be not greater than 5°.

In the description herein, "sipe" can represent or be defined as a cut element having a small width such that the width between the pair of sipe walls 51 at the body portion 50 is not greater than 1.5 mm. For instance, the width of the sipe can be 0.5 to 1.5 mm. A chamfered portion having a width of greater than 1.5 mm may be connected to the opening of the sipe. A flask bottom having a width of greater than 1.5 mm, for instance, may be connected to the bottom of the sipe.

As shown in FIG. 3 and FIG. 4, in the present disclosure, a width W3 of the body portion 50 of the outer shoulder sipe 42 can be greater than a width W4 of the body portion 50 of the outer middle sipe 16. In the present disclosure, by adopting the above-described structure, steering stability and noise performance can be enhanced.

As shown in FIG. 2, in the present disclosure, the outer shoulder land portion 11 can have the greatest width, in the tire axial direction, of the ground contact surface among the five land portions, so that a high cornering force may be exhibited at the outer shoulder land portion 11, for instance, to enhance steering stability.

Furthermore, the outer shoulder sipes 42 and the outer middle sipes 16 may reduce stiffness of the outer shoulder land portion 11 and the outer middle land portion 13, so that impact sound can be reduced when the tire comes into contact with the ground. Therefore, noise performance can be enhanced.

Moreover, in the present disclosure, as shown in FIG. 3 and FIG. 4, the width W3 of the body portion 50 of the outer shoulder sipe 42 can be greater than the width W4 of the body portion 50 of the outer middle sipe 16, for instance, so that balance in stiffness between the outer shoulder land portion 11 and the outer middle land portion 13 can become appropriate, and steering stability can be further enhanced. The outer shoulder sipe 42 and the outer middle sipe 16 having different widths of the body portion 50 can act such that a pitch sound generated by the sipes 42 and 16 becomes white noise, so that noise performance can be enhanced. In the present disclosure, the tire 1 can be assumed to enhance steering stability and noise performance by the above-described mechanism.

As shown in FIG. 3, from the viewpoint of well-balanced enhancement of steering stability and noise performance, the width W3 of the body portion 50 of the outer shoulder sipe 42 can be, for example, 0.6 to 1.0 mm. As shown in FIG. 4, the width W4 of the body portion 50 of the outer middle sipe 16 can be, for example, 0.4 to 0.8 mm. The width W3 can be 115% to 150% of the width W4, such as 125% to 140% thereof.

The configurations of the present embodiment will be described below in more detail. The configurations described below can represent a specific mode of the present embodiment. Therefore, it is needless to say that the present disclosure can provide the above-described effect(s) even when the configurations described below are not provided. In addition, even when any one of the configurations described below is independently applied to the tire according to the present disclosure having the above-described characteristics, performance improvement corresponding to each configuration can be expected. Furthermore, when some of the configurations described below are applied in combination, complex performance improvement corresponding to the configurations can be expected.

As shown in FIG. 2, in the present embodiment, for example, the outer shoulder sipe 42 can extend from the outer shoulder circumferential groove 6 and can have an end potion that terminates in the outer shoulder land portion 11 without reaching the outer tread end To. Hereinafter, the end portion may be referred to as a terminating end 42a. A length L3, in the tire axial direction, of the outer shoulder sipe 42 can be, for example, 40% to 60% of the width W2, in the tire axial direction, of the ground contact surface of the outer shoulder land portion 11.

The outer shoulder sipe 42 can be, for example, inclined in the right-downward direction relative to the tire axial direction. Hereinafter, this inclination direction may be expressed by "inclined in a first direction relative to the tire axial direction." An angle of the outer shoulder sipe 42 relative to the tire axial direction can be, for example, 5 to 15°. The outer shoulder sipe 42 having such a structure can maintain wet performance while reducing uneven wear of the outer shoulder land portion 11.

As shown in FIG. 3, in the present embodiment, the outer shoulder sipe 42 can have a chamfered portion 43 at at least one of sipe edges on both sides, and, in the present embodiment, at both the sipe edges. In the present embodiment, for example, the chamfered portion 43 can be formed by an inclined surface 52a extending between the ground contact surface of the land portion and the sipe wall 51 at the body portion 50 of the sipe. As shown in FIG. 2, the chamfered portion 43 of the outer shoulder sipe 42 can have a chamfered width increased from the terminating end 42a side toward the outer shoulder circumferential groove 6. Thus, a ground contact pressure acting on the outer shoulder land portion 11 can become uniform to enhance steering stability and noise performance.

For example, the chamfered width of the chamfered portion 43 of the outer shoulder sipe 42 can continuously increase from the terminating end 42a side toward the outer shoulder circumferential groove 6. The maximum chamfered width W5 of the chamfered portion 43 can be, for example, 2.0 to 4.0 mm. The maximum depth of the chamfered portion 43 can be, for example, 1.0 to 2.0 mm. In the present embodiment, the maximum chamfered width W5 can be formed at the end of the outer shoulder sipe 42 on the outer shoulder circumferential groove 6 side.

Figure 5:
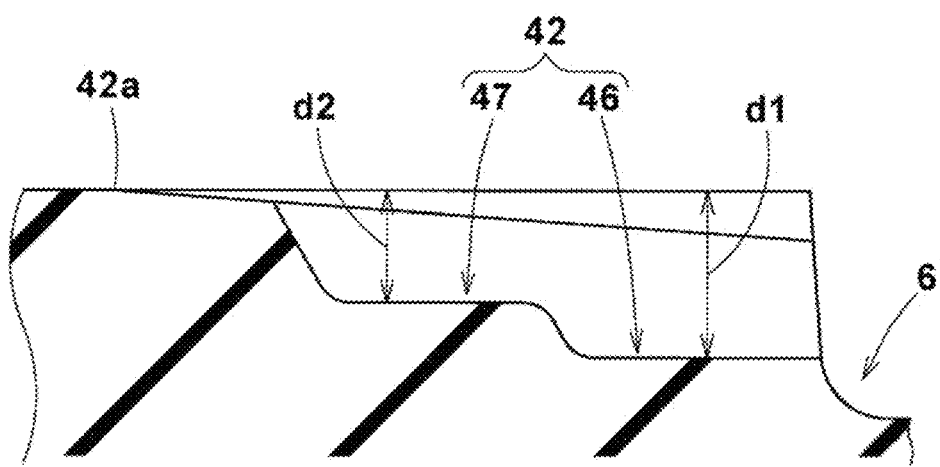
FIG. 5 is a cross-sectional view taken along a line C-C in FIG. 2.

FIG. 5 is a cross-sectional view taken along a line C-C in FIG. 2. As shown in FIG. 5, the outer shoulder sipe 42 can include a first portion 46 on the outer shoulder circumferential groove 6 side, and a second portion 47 on the terminating end 42a side and can have a depth less than that of the first portion 46. A depth d2 of the second portion 47 can be, for example, 60% to 75% of a depth d1 of the first portion 46. In the present embodiment, the first portion 46 may have the maximum depth in the outer shoulder sipe 42. The maximum depth of the outer shoulder sipe 42 can be, for example, 3.5 to 5.0 mm. In the present embodiment, the maximum depth of the outer shoulder sipe 42 can be greater than the maximum depth of the outer middle sipe 16. The outer shoulder sipe 42 having such a structure can contribute to well-balanced enhancement of steering stability and noise performance.

As shown in FIG. 2, in the present embodiment, the outer shoulder land portion 11 can include a plurality of outer shoulder lateral grooves 41. In the present embodiment, the outer shoulder lateral grooves 41 and the outer shoulder sipes 42 can alternate in the tire circumferential direction.

The outer shoulder lateral groove 41 can extend from the outer shoulder circumferential groove 6 beyond the outer tread end To. The outer shoulder lateral groove 41 can be, for example, inclined in the first direction relative to the tire axial direction. An angle of the outer shoulder lateral groove 41 relative to the tire axial direction can be, for example, 5 to 15°. An angular difference between the outer shoulder sipe 42 and the outer shoulder lateral groove 41 can be not greater than 10°, and, in the present embodiment, the outer shoulder sipe 42 and the outer shoulder lateral groove 41 can extend in parallel to each other, for instance. The outer shoulder lateral groove 41 having such a structure can enhance wet performance while reducing uneven wear of the outer shoulder land portion 11.

Figure 6:
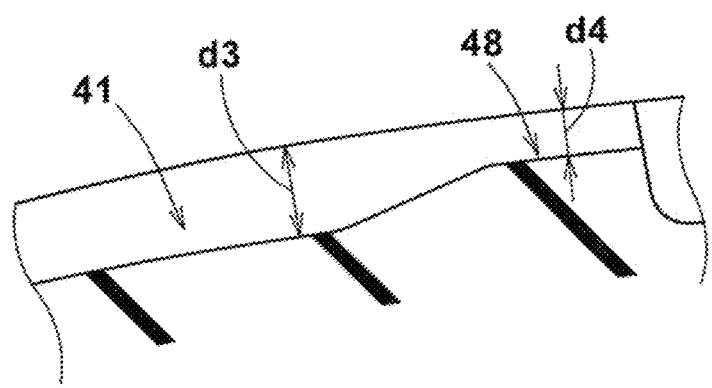
FIG. 6 is a cross-sectional view taken along a line D-D in FIG. 2.

FIG. 6 is a cross-sectional view taken along a line D-D in FIG. 2. As shown in FIG. 6, the outer shoulder lateral groove 41 can include a tie bar 48 having a locally raised groove bottom. The minimum depth d4 from the ground contact surface of the outer shoulder land portion 11 to the outer surface of the tie bar 48 can be 40% to 60% of the maximum depth d3 of the outer shoulder lateral groove 41. The tie bar 48 having such a structure can enhance noise performance and braking performance while maintaining wet performance.

As shown in FIG. 2, in the present embodiment, the outer middle sipe 16 can extend completely across the outer middle land portion 13 in the tire axial direction. The outer middle sipe 16 can be, for example, inclined in the right-upward direction relative to the tire axial direction. Hereinafter, this inclination direction may be expressed by "inclined in a second direction relative to the tire axial direction." According to one or more embodiments, an angle of the outer middle sipe 16 relative to the tire axial direction can be greater than the angle of the outer shoulder sipe 42 relative to the tire axial direction. Specifically, the angle of the outer middle sipe 16 relative to the tire axial direction can be 20 to 30°, for instance. The outer middle sipes 16 having such a structure can allow a frictional force to be exerted also in the tire axial direction during running on a wet surface.

The outer middle sipe 16 can have a chamfered portion 55 at at least one of sipe edges on both sides, and, in the present embodiment, at both sipe edges.

The chamfered portion 55 of the outer middle sipe 16 can include, for example, a constant width portion 55*a*, an inner increased-width portion 55*b*, and an outer increased-width portion 55*c*. The constant width portion 55*a* can extend with a constant chamfered width in the sipe length direction. The inner increased-width portion 55*b* can be, for example, continuous with the outer crown circumferential groove 8 side of the constant width portion 55*a*, and can have a chamfered width increased from the constant width portion 55*a* toward the outer crown circumferential groove 8. The outer increased-width portion 55*c* can be, for example, continuous with the outer shoulder circumferential groove 6 side of the constant width portion 55*a*, and can have a chamfered width increased from the constant width portion 55*a* toward the outer shoulder circumferential groove 6. Thus, the chamfered portion 55 of the outer middle sipe 16 can have the minimum chamfered width at a position distant from circumferential edges on both sides of the outer middle land portion 13, and the chamfered width can increase from the position having the minimum chamfered width toward both the sides in the tire axial direction. The outer middle sipe 16 that can include the chamfered portion 55 having such a structure can facilitate uniformization of a ground contact pressure acting on the outer middle land portion 13, and can contribute to further enhancement of steering stability.

The constant width portion 55*a* can be, for example, disposed so as to be displaced from the center position, in the tire axial direction, of the outer middle land portion 13 toward the outer tread end To. Thus, a length, in the tire axial direction, of the inner increased-width portion 55*b* can be greater than a length, in the tire axial direction, of the outer increased-width portion 55*c*. Specifically, the length L4 of the inner increased-width portion 55*b* can be, for instance, 40% to 60% of a width W6 of a ground contact surface of the outer middle land portion 13. The length L5 of the outer increased-width portion 55*c* can be, for instance, 25% to 35% of the width W6 of the ground contact surface of the outer middle land portion 13. Thus, even in a case where a ground contact pressure acting on the outer middle land portion 13 is changed, excellent steering stability and noise performance can be assuredly exhibited.

Figure 7:
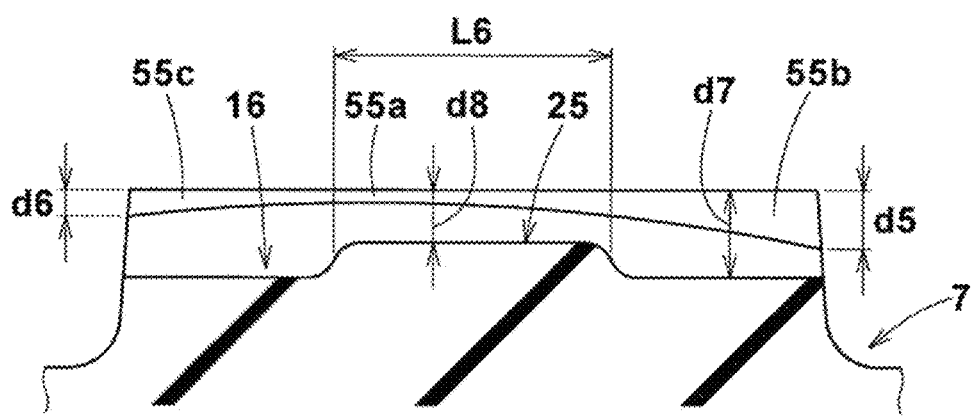
FIG. 7 is a cross-sectional view taken along a line E-E in FIG. 2.

FIG. 7 is a cross-sectional view taken along a line E-E in FIG. 2. As shown in FIG. 7, the maximum depth d5 of the inner increased-width portion 55*b* can be greater than the maximum depth d6 of the outer increased-width portion 55*c*. Specifically, the depth d6 of the outer increased-width portion 55*c* can be, for instance, 20% to 60% of the depth d5 of the inner increased-width portion 55*b*. The depth d5 of the inner increased-width portion 55*b* and the depth d6 of the outer increased-width portion 55*c* can be, for example, 0.5 to 3.0 mm. The minimum depth of the chamfered portion 55 can be, for example, 0.3 to 1.0 mm.

The outer middle sipe 16 can include, for example, a middle tie bar 25 having a locally raised bottom portion. The middle tie bar 25 can be, for example, in the center of three regions in a case where the outer middle sipe 16 is equally divided into the three regions in the tire axial direction. A length L6, in the tire axial direction, of the middle tie bar 25 can be, for instance, 30% to 50% of the width W6 (shown in FIG. 2), in the tire axial direction, of the ground contact surface of the outer middle land portion 13. A depth d8 from the ground contact surface of the outer middle land portion 13 to the outer surface of the middle tie bar 25 can be, for instance, 50% to 70% of the maximum depth d7 of the outer middle sipe 16. The middle tie bar 25 having such a structure can contribute to maintaining stiffness of the outer middle land portion 13 and exerting a high cornering force. The maximum depth of the outer middle sipe 16 can be, for example, 3.0 to 5.0 mm.

Figure 8:
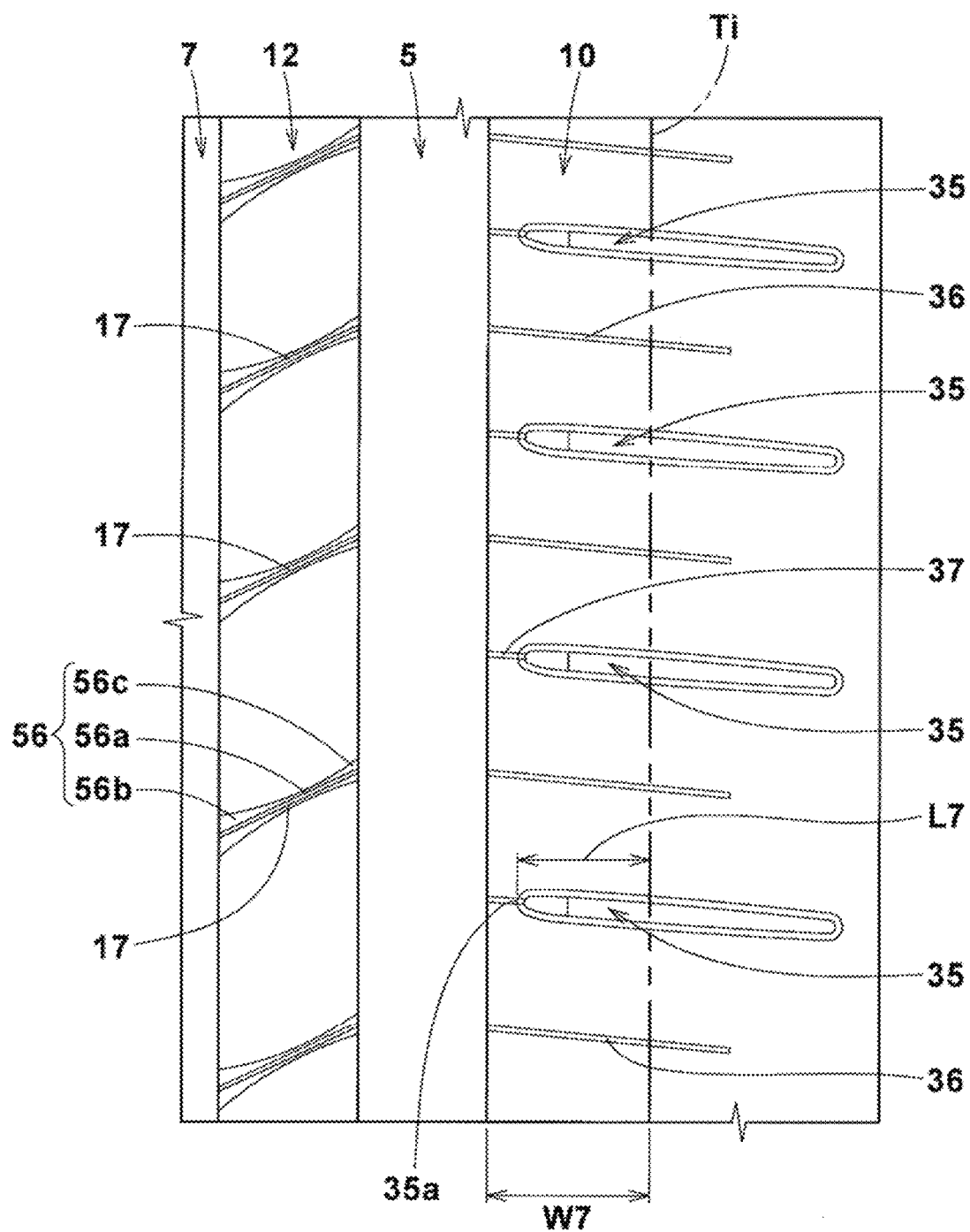
FIG. 8 is an enlarged view of an inner middle land portion and an inner shoulder land portion of the tread portion in FIG. 1.

FIG. 8 is an enlarged view of the inner middle land portion 12 and the inner shoulder land portion 10. As shown in FIG. 8, the inner middle land portion 12 can include a plurality of inner middle sipes 17 that can extend completely across the inner middle land portion 12 in the tire axial direction.

A width of a body portion of the inner middle sipe 17 can be, for example, 0.4 to 0.8 mm. The maximum depth of the inner middle sipe 17 can be, for example, 3.0 to 5.0 mm. The inner middle sipe 17 can be, for example, inclined in the second direction relative to the tire axial direction. An angle of the inner middle sipe 17 relative to the tire axial direction can be, for example, 20 to 30°. The inner middle sipe 17 having such a structure can allow a frictional force to be exerted also in the tire axial direction during running on a wet surface.

The inner middle sipe 17 can have a chamfered portion 56 at each of sipe edges on both sides. The chamfered portion 56 of the inner middle sipe 17 can include, for example, a constant width portion 56*a*, an inner increased-width portion 56*b* that is continuous with the inner crown circumferential groove 7 side of the constant width portion 56*a*, and an outer increased-width portion 56*c* that is continuous with the inner shoulder circumferential groove 5 side of the constant width portion 56*a*. To the constant width portion 56*a*, the inner increased-width portion 56*b*, and the outer increased-width portion 56*c* of the inner middle sipe 17, the above-described structures of the constant width portion 55*a*, the inner increased-width portion 55*b*, and the outer increased-width portion 55*c* (shown in FIG. 2) of the chamfered portion 55 of the outer middle sipe 16 can be applied, and the description thereof is omitted.

The inner shoulder land portion 10 can include a plurality of inner shoulder lateral grooves 35 and a plurality of inner shoulder sipes 36. In the present embodiment, the inner shoulder lateral grooves 35 and the inner shoulder sipes 36 can alternate in the tire circumferential direction.

The inner shoulder lateral groove 35 can extend from an inner end 35a disposed between the inner tread end Ti and the inner shoulder circumferential groove 5 beyond the inner tread end Ti. For example, the inner shoulder lateral groove 35 can extend across the center position, in the tire axial direction, of a ground contact surface of the inner shoulder land portion 10. A length L7, in the tire axial direction, of the inner shoulder lateral groove 35 at the ground contact surface of the inner shoulder land portion 10 can be, for example, 70% to 90% of a width W7, in the tire axial direction, of the ground contact surface of the inner shoulder land portion 10. The inner shoulder lateral groove 35 having such a structure can contribute to enhancing braking performance while maintaining wet performance.

The inner shoulder lateral groove 35 can be, for example, inclined in the first direction relative to the tire axial direction. An angle of the inner shoulder lateral groove 35 relative to the tire axial direction can be, for example, 5 to 15°. The inner shoulder lateral groove 35 having such a structure can guide water thereinside toward the inner tread end Ti during running on a wet surface and can exhibit excellent drainage performance.

The inner shoulder sipe 36 can be connected to at least the inner shoulder circumferential groove 5. In the present embodiment, the inner shoulder sipe 36 can extend from the inner shoulder circumferential groove 5 beyond the inner tread end Ti. For example, the inner shoulder sipe 36 can linearly extend so as to be inclined in the first direction relative to the tire axial direction. An angle of the inner shoulder sipe 36 relative to the tire axial direction can be, for example, 5 to 15°. An angular difference between the inner shoulder sipe 36 and the inner shoulder lateral groove 35 may be not greater than 10°, and, in the present embodiment, the inner shoulder sipe 36 and the inner shoulder lateral groove 35 can extend in parallel to each other, for instance. The inner shoulder sipe 36 having such a structure can enhance noise performance and ride comfort while reducing uneven wear of the inner shoulder land portion 10.

The inner shoulder sipe 36 may not have any chamfered portions. That is, the inner shoulder sipe 36 can have a sipe wall that is connected directly to the ground contact surface of the inner shoulder land portion 10, and that extends along the tire radial direction. The inner shoulder sipe 36 having such a structure can exert, with its edges, a high frictional force during running on a wet surface.

A width of a body portion of the inner shoulder sipe 36 can be, for example, 0.6 to 1.0 mm. According to one or more embodiments, the width of the body portion of the inner shoulder sipe 36 can be greater than the width of the body portion of the inner middle sipe 17. The maximum depth of the inner shoulder sipe 36 can be 4.0 to 5.5 mm. Thus, steering stability and noise performance can be further enhanced.

In the present embodiment, the inner shoulder land portion 10 can have an auxiliary sipe 37 that extends from the inner shoulder circumferential groove 5 to the inner end 35a of the inner shoulder lateral groove 35. The auxiliary sipe 37 having such a structure can contribute to maintaining wet performance.

Figure 9:
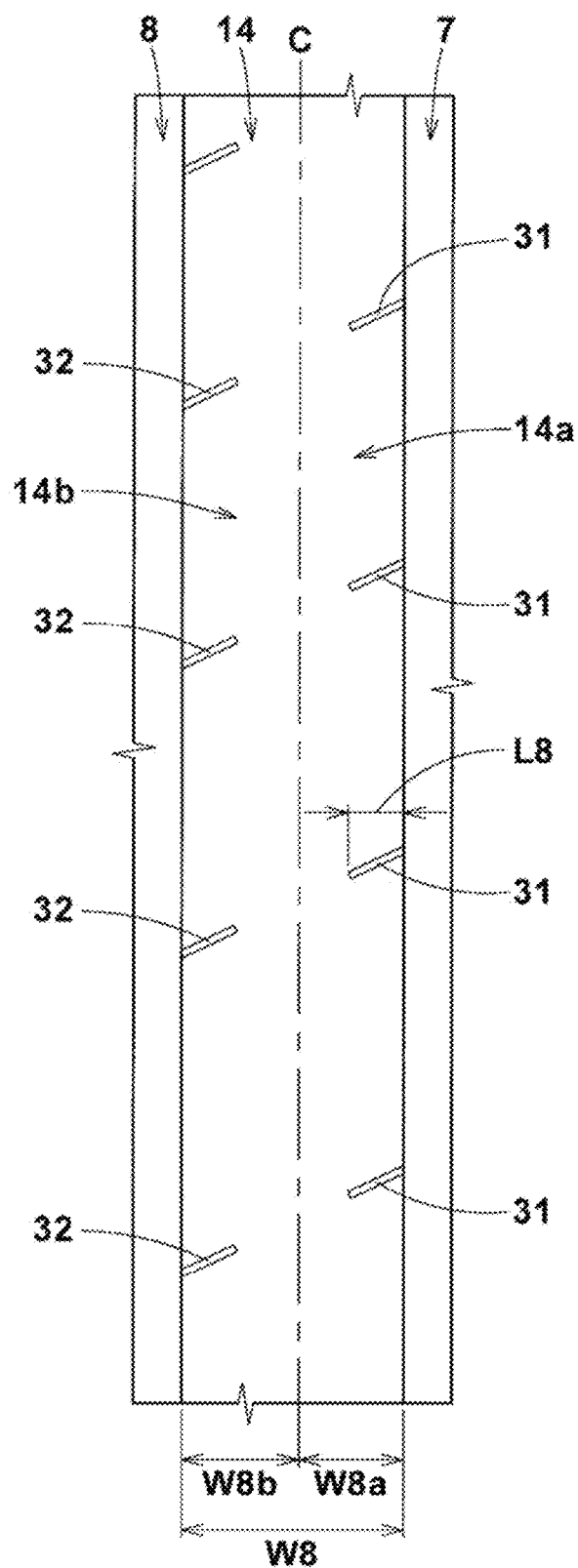
FIG. 9 is an enlarged view of a crown land portion of the tread portion in FIG. 1.

FIG. 9 is an enlarged view of the crown land portion 14 in FIG. 1. As shown in FIG. 9, the center position, in the tire axial direction, of the crown land portion 14 can be displaced from the tire equator C toward the outer tread end To (shown in FIG. 1). Thus, in the crown land portion 14, a width W8b of a ground contact surface of an outer region 14b located between the outer tread end To and the tire equator C can be greater than a width W8a of a ground contact surface of an inner region 14a located between the inner tread end Ti and the tire equator C. Specifically, the width W8b of the outer region 14b can be, for example, 51% to 55% of a width W8 of a ground contact surface of the crown land portion 14. The crown land portion 14 having such a structure can allow change of a cornering force according to change of a steering angle to become linear, and can contribute to enhancement of steering stability and ride comfort.

The crown land portion 14 can include a plurality of first crown sipes 31 and a plurality of second crown sipes 32. For example, the first crown sipe 31 can extend from the inner crown circumferential groove 7 and can terminate in the crown land portion 14. For example, the second crown sipe 32 can extend from the outer crown circumferential groove 8 and can terminate in the crown land portion 14. The width of each of body portions of the first crown sipe 31 and the second crown sipe 32 can be, for example, 0.5 to 1.5 mm. The maximum depth of each of the first crown sipe 31 and the second crown sipe 32 can be, for instance, 4.0 to 6.0 mm. The first crown sipe 31 and the second crown sipe 32 having such structures can reduce rolling resistance while maintaining wet performance.

In order to assuredly exhibit the above-described effect, each of the first crown sipe 31 and the second crown sipe 32 may not extend across the center position, in the tire axial direction, of the crown land portion 14 and may not extend across the tire equator C. A length L8, in the tire axial direction, of the first crown sipe 31 or the second crown sipe 32 can be, for example, 15% to 30% of the width W8, in the tire axial direction, of the ground contact surface of the crown land portion 14.

The first crown sipe 31 and the second crown sipe 32 can be, for example, inclined in the second direction relative to the tire axial direction. An angle of the first crown sipe 31 or the second crown sipe 32 relative to the tire axial direction can be, for example, 20 to 30°. According to one or more embodiments, an angular difference between the outer middle sipe 16 and the first crown sipe 31 or the second crown sipe 32 may not be greater than 10°. Thus, uneven wear of the crown land portion 14 can be reduced.

Figure 10:
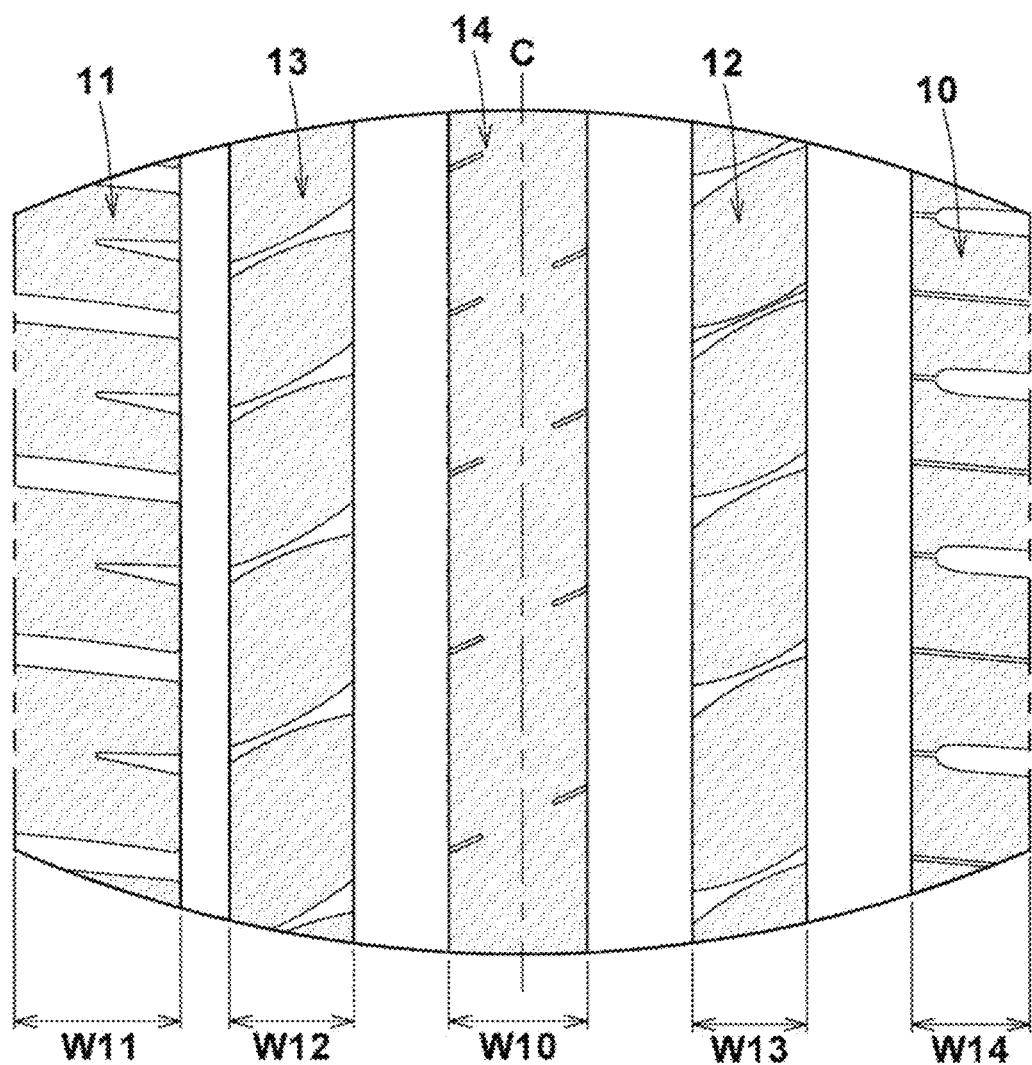
FIG. 10 is a plan view of a ground contact surface shape of the tire associated with the tread portion in FIG. 1.

FIG. 10 shows a ground contact surface shape obtained when 50% of the normal load (hereinafter, may be referred to or characterized as "50% load state") is applied to the tire 1 in the normal state. As shown in FIG. 10, in the 50% load state, a width W11, in the tire axial direction, of the ground contact surface of the outer shoulder land portion 11 can be, for instance, 114% to 124% of a width W10, in the tire axial direction, of the ground contact surface of the crown land portion 14.

Similarly, a width W12, in the tire axial direction, of the ground contact surface of the outer middle land portion 13 can be, for instance, 85% to 115% of the width W10, in the tire axial direction, of the ground contact surface of the crown land portion 14. The width W12, in the tire axial direction, of the ground contact surface of the outer middle land portion 13 can be greater than a width W13, in the tire axial direction, of a ground contact surface of the inner middle land portion 12. Specifically, the width W12 of the outer middle land portion 13 can be, for instance, 105% to 115% of the width W13 of the inner middle land portion 12. Each of the width W13, in the tire axial direction, of the ground contact surface of the inner middle land portion 12 and a width W14, in the tire axial direction, of the ground contact surface of the inner shoulder land portion 10 can be, for instance, 80% to 100% of the width W10, in the tire axial direction, of the ground contact surface of the crown land portion 14. Thus, in a case where the tires 1 of the present embodiment are applied to all wheels of a vehicle, the front wheels and the rear wheels can exhibit cornering forces in a well-balanced manner, and excellent steering stability is consequently exhibited.

Figure 11:
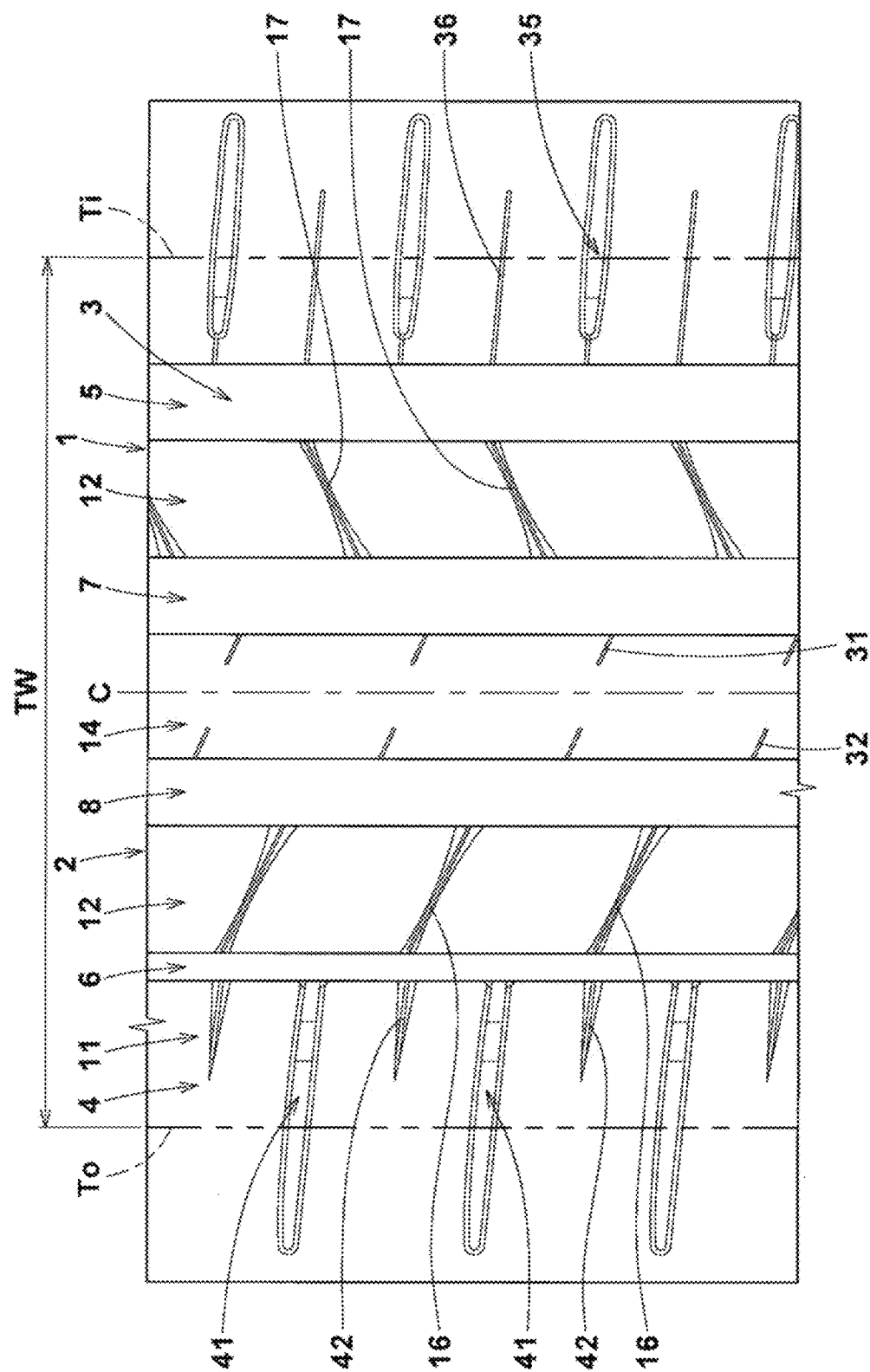
FIG. 11 is a development of a tread portion according to another embodiment of the present disclosure.

FIG. 11 is a development of a tread portion 2 according to another embodiment of the present disclosure. As shown in FIG. 11, the present embodiment is different from the embodiment shown in FIG. 1 in that, in the present embodiment, the outer middle sipes 16, and the first crown sipes 31 and the second crown sipes 32 can be inclined in the first direction relative to the tire axial direction. Such an embodiment can contribute to enhancement of conicity of the tire. To the embodiment in FIG. 11, the structure included in the embodiment shown in FIG. 1 to FIG. 10 can be applied.

Figure 12:
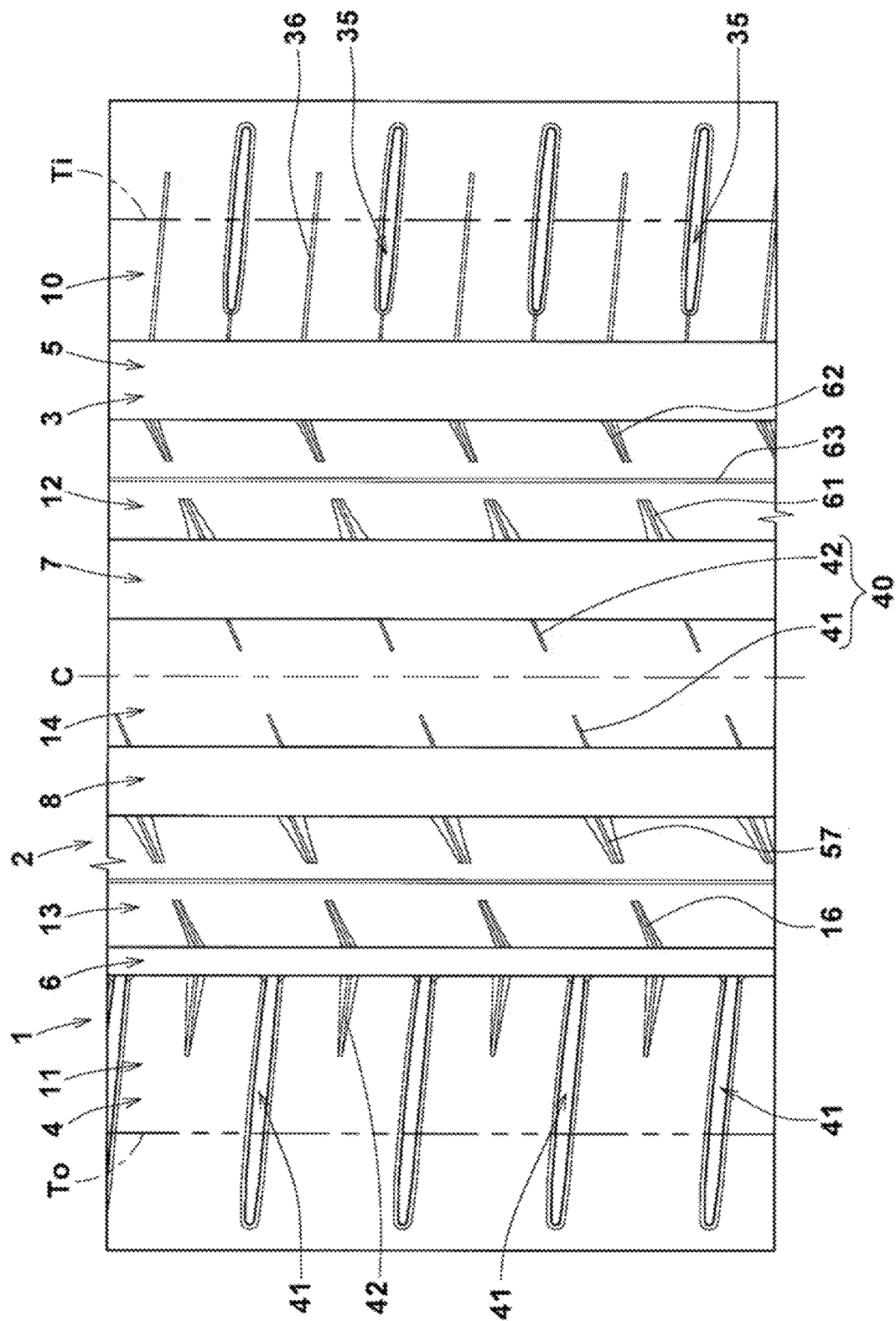
FIG. 12 is a development of a tread portion according to another embodiment of the present disclosure.
Figure 13:
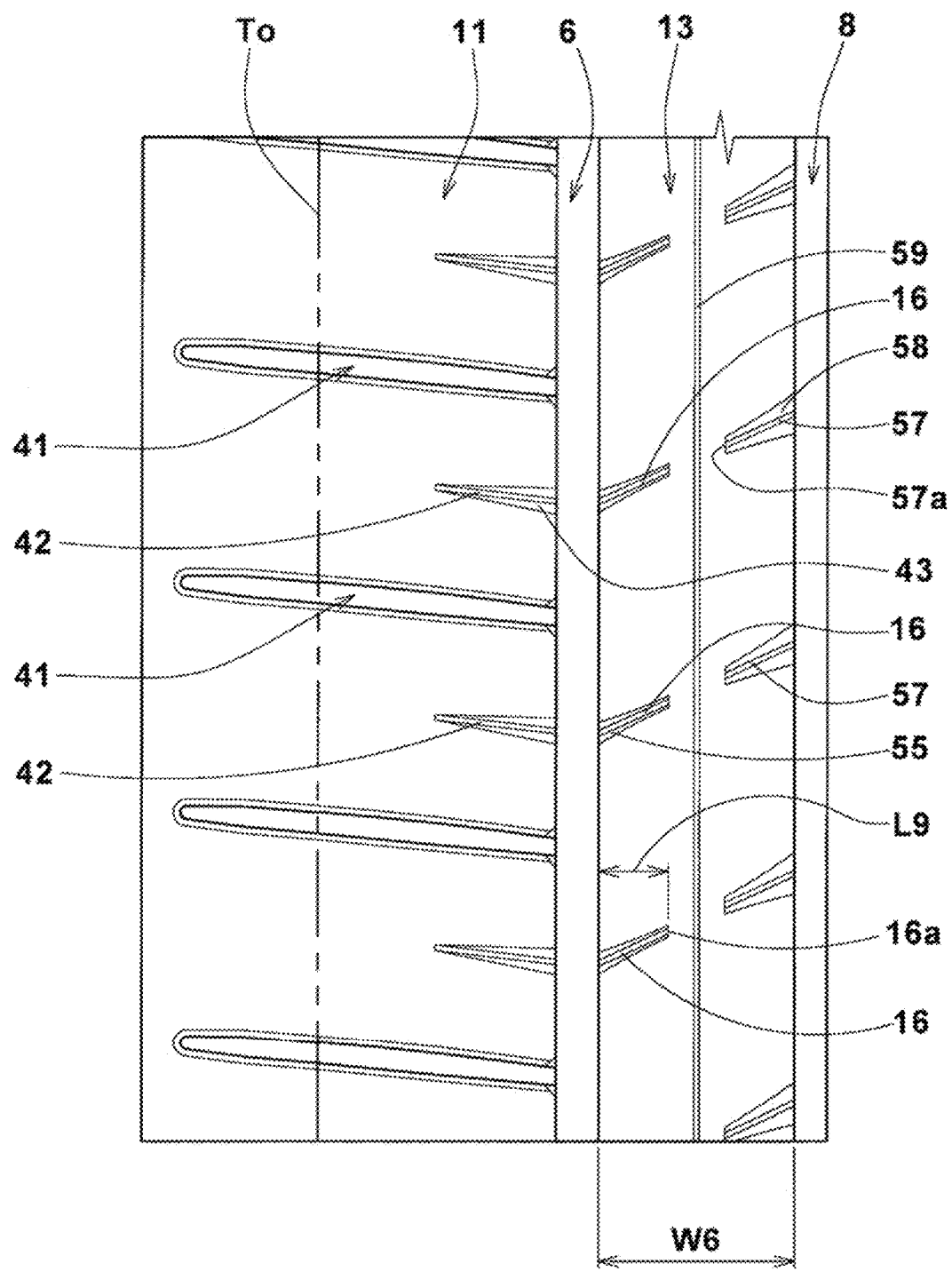
FIG. 13 is an enlarged view of an outer shoulder land portion and an outer middle land portion of the tread portion in FIG. 12.

FIG. 12 is a development of a tread portion 2 according to another embodiment of the present disclosure. FIG. 13 is an enlarged view of an outer shoulder land portion 11 and an outer middle land portion 13 according to the embodiment shown in FIG. 12. As shown in FIG. 12 and FIG. 13, in the present embodiment, an outer middle sipe 16 can have an end portion that terminates in the outer middle land portion 13 without reaching the outer crown circumferential groove 8. The outer middle sipe 16 having such a structure can maintain stiffness of the outer middle land portion 13 and can contribute to enhancement of steering stability. The structure included in the embodiment shown in FIG. 1 to FIG. 10 can be applied to a structure which is not particularly described for the present embodiment.

As shown in FIG. 13, the outer middle sipe 16 of the present embodiment can terminate between the outer shoulder circumferential groove 6 and the center position, in the tire axial direction, of the ground contact surface of the outer middle land portion 13. A length L9, in the tire axial direction, of the outer middle sipe 16 can be, for example, 25% to 45% of the width W6, in the tire axial direction, of the ground contact surface of the outer middle land portion 13. The outer middle sipe 16 having such a structure can contribute to well-balanced enhancement of steering stability and wet performance.

In the present embodiment, the outer middle sipe 16 can have the chamfered portion 55 at at least one of sipe edges on both sides, for example, at both sipe edges. The chamfered portion 55 of the outer middle sipe 16 can have a chamfered width that increases from a terminating end 16a side toward the outer shoulder circumferential groove 6. The maximum chamfered width of the chamfered portion 55 of the outer middle sipe 16 can be 0.5 to 2.5 mm, for instance. The maximum depth of the chamfered portion 55 can be, for example, 0.5 to 2.5 mm. The outer middle sipe 16 that can include the chamfered portion 55 having such a structure can enhance steering stability and noise performance in a well-balanced manner.

In the present embodiment, the maximum chamfered width of the chamfered portion 43 of the outer shoulder sipe 42 can be, for example, 1.0 to 3.0 mm. The maximum depth of the chamfered portion 43 of the outer shoulder sipe 42 can be, for example, 0.2 to 2.2 mm. In the present embodiment, the maximum depth of the chamfered portion 55 of the outer middle sipe 16 can be greater than the maximum depth of the chamfered portion 43 of the outer shoulder sipe 42. Thus, uneven wear around the outer shoulder circumferential groove 6 can be reduced.

In the present embodiment, a plurality of terminating middle sipes 57 other than the outer middle sipes 16 can be disposed in the outer middle land portion 13. The terminating middle sipe 57 can be connected to the outer crown circumferential groove 8 and can have an end portion that terminates in the outer middle land portion 13 without reaching the outer shoulder circumferential groove 6. To a length, in the tire axial direction, of the terminating middle sipe 57, the above-described length of the outer middle sipe 16 can be applied. The terminating middle sipe 57 having such a structure can further enhance steering stability and noise performance in conjunction with the above-described outer middle sipe 16.

The terminating middle sipe 57 can have a chamfered portion 58 at at least one of sipe edges on both sides, for instance, at both sipe edges. The chamfered portion 58 of the terminating middle sipe 57 can have a chamfered width that increases from a terminating end 57a side toward the outer crown circumferential groove 8. According to one or more embodiments, the maximum chamfered width of the chamfered portion of the terminating middle sipe 57 can be greater than the maximum chamfered width of the chamfered portion 55 of the outer middle sipe 16. The maximum depth of the chamfered portion 58 of the terminating middle sipe 57 can be greater than the maximum depth of the chamfered portion 55 of the outer middle sipe 16. Thus, uneven wear of the outer middle land portion 13 can be reduced.

In the present embodiment, the outer middle land portion 13 can include one outer middle circumferential sipe 59 that extends continuously in the tire circumferential direction. For example, the outer middle circumferential sipe 59 can be in the center of three regions in a case where the ground contact surface of the outer middle land portion 13 is equally divided into the three regions in the tire axial direction. The outer middle circumferential sipe 59 can extend at an angle of not greater than 5° relative to the tire circumferential direction, and more specifically can extend linearly, for instance, so as to be parallel to the tire circumferential direction. In another embodiment, the outer middle circumferential sipe 59 may zigzag. The outer middle circumferential sipe 59 having such a structure can allow a frictional force to be exerted in the tire axial direction, and can enhance cornering performance.

As shown in FIG. 12, in the present embodiment, the inner middle land portion 12 can include first inner middle sipes 61, second inner middle sipes 62, and an inner middle circumferential sipe 63. To the first inner middle sipe 61, the above-described structure of the terminating middle sipe 57 disposed in the outer middle land portion 13 can be applied. To the second inner middle sipe 62, the structure of the outer middle sipe 16 in the embodiment shown in FIG. 12 can be applied. To the inner middle circumferential sipe 63, the structure of the outer middle circumferential sipe 59 can be applied.

Although the tire according to the embodiments of the present disclosure has been described above in detail, the present disclosure is not limited to the above-described specific embodiments, and various modifications can be made to implement the technique of the present disclosure.

Examples

Test tires having the basic pattern shown in FIG. 1 and a size of 235/45R19 were produced based on the specifications in Table 1. As a comparative example, a test tire in which the width of the body portion of the outer shoulder sipe was equal to the width of the body portion of the outer middle sipe, was produced. The tire of the comparative example was substantially the same as the tire shown in FIG. 1 except for the above-described structure. For each test tire, steering stability and noise performance were tested. Specifications common to the test tires, and test methods were as follows.

Rim on which the tire was mounted: 19×8.0J
Tire internal pressure: 230 kPa
Test vehicle: four-wheel-drive vehicle having an engine displacement of 2000 cc
Positions at which the tires were mounted: all wheels
<Steering Stability>
A driver made sensory evaluation for steering stability when the test vehicle was caused to run on a dry road surface. The result is indicated as a score with the steering stability of the comparative example being 100. The greater the value is, the more excellent steering stability is.
<Noise Performance>
Exterior noise was measured when the test vehicle was caused to run on a dry road surface at a speed of 70 km/h. The result is indicated as an index with exterior noise of the comparative example being 100. The less the value is, the less exterior noise is and the better the noise performance is.
The test results are indicated in Table 1.

the five land portions include an outer shoulder land portion including the outer tread end, and an outer middle land portion disposed adjacent to the outer shoulder land portion via the outer shoulder circumferential groove, the outer shoulder land portion has a greatest width, in a tire axial direction, of a ground contact surface among the five land portions, the outer shoulder land portion includes a plurality of outer shoulder sipes connected to the outer shoulder circumferential groove, the outer middle land portion includes a plurality of outer middle sipes connected to the outer shoulder circumferential groove, each of the outer shoulder sipes and the outer middle sipes includes a pair of sipe walls, each of the outer shoulder sipes and the outer middle sipes includes a body portion in which the pair of sipe walls are disposed substantially parallel to each other, and a width of the body portion of each outer shoulder sipe is greater than a width of the body portion of each outer middle sipe.

[Disclosure 2]
In the tire according to disclosure 1, the outer middle sipes extend completely across the outer middle land portion in the tire axial direction.

TABLE 1

|  | Comparative example | Example 1 | Example 2 | Example 3 | Example 4 | Example 5 | Example 6 | Example 7 | Example 8 | Example 9 |
|---|---|---|---|---|---|---|---|---|---|---|
| Width W3 (mm) of body portion of outer shoulder sipe | 0.7 | 0.8 | 0.7 | 0.9 | 1.0 | 1.1 | 0.8 | 0.8 | 0.8 | 0.8 |
| Width W4 (mm) of body portion of outer middle sipe | 0.7 | 0.6 | 0.6 | 0.6 | 0.6 | 0.6 | 0.3 | 0.4 | 0.5 | 0.7 |
| Width W3/Width W4 (%) | 100 | 133 | 117 | 150 | 167 | 183 | 267 | 200 | 160 | 114 |
| Steering stability (score) | 100 | 106 | 107 | 106 | 105 | 104 | 104 | 105 | 106 | 106 |
| Noise performance (index) | 100 | 93 | 97 | 93 | 93 | 92 | 92 | 93 | 93 | 96 |

As indicated in Table 1, the tires of the examples were confirmed to enhance steering stability and noise performance.

APPENDIXES

The present disclosure includes the following aspects. An object of the present disclosure, among multiple objects, can be to provide a tire that can enhance steering stability and noise performance.

[Disclosure 1]
A tire includes a tread portion having a designated mounting direction to a vehicle,
the tread portion includes an outer tread end located on an outer side of the vehicle when the tire is mounted to the vehicle, an inner tread end located on an inner side of the vehicle when the tire is mounted to the vehicle, four circumferential grooves extending continuously in a tire circumferential direction between the outer tread end and the inner tread end, and five land portions demarcated by the four circumferential grooves,
the four circumferential grooves include an outer shoulder circumferential groove disposed closest to the outer tread end when the tire is mounted to the vehicle,

[Disclosure 3]
In the tire according to disclosure 1 or 2, each outer shoulder sipe has an end portion terminating in the outer shoulder land portion without reaching the outer tread end.

[Disclosure 4]
In the tire according to any one of disclosures 1 to 3, a maximum depth of each outer shoulder sipe is greater than a maximum depth of each outer middle sipe.

[Disclosure 5]
In the tire according to any one of disclosures 1 to 4,
each outer shoulder sipe has a chamfered portion at at least one of sipe edges on both sides, and
the chamfered portion of each outer shoulder sipe has a width increased toward the outer shoulder circumferential groove.

[Disclosure 6]
In the tire according to any one of disclosures 1 to 5,
the outer middle sipes extend completely across the outer middle land portion in the tire axial direction, and each have a chamfered portion at at least one of sipe edges on both sides, and
the chamfered portion of each outer middle sipe has a minimum chamfered width at a position distant from circumferential edges on both sides of the outer middle land portion and has a chamfered width increased from a position having the minimum chamfered width toward both the sides in the tire axial direction.

[Disclosure 7]

In the tire according to any one of disclosures 1 to 6, the four circumferential grooves include an inner shoulder circumferential groove disposed closest to the inner tread end when the tire is mounted to the vehicle, the five land portions include an inner shoulder land portion including the inner tread end, and an inner middle land portion disposed adjacent to the inner shoulder land portion via the inner shoulder circumferential groove, the inner shoulder land portion includes a plurality of inner shoulder sipes connected to the inner shoulder circumferential groove, the inner middle land portion includes a plurality of inner middle sipes extending completely across the inner middle land portion in the tire axial direction, each of the inner shoulder sipes and the inner middle sipes includes a pair of sipe walls, each of the inner shoulder sipes and the inner middle sipes includes a body portion in which the pair of sipe walls are disposed substantially parallel to each other, and a width of the body portion of each inner shoulder sipe is greater than a width of the body portion of each inner middle sipe.

[Disclosure 8]

In the tire according to disclosure 7, each inner shoulder sipe extends beyond the inner tread end.

[Disclosure 9]

In the tire according to any one of disclosures 1 to 8, the four circumferential grooves include an outer crown circumferential groove and an inner crown circumferential groove disposed on both sides, respectively, of a tire equator, the five land portions include a crown land portion demarcated between the outer crown circumferential groove and the inner crown circumferential groove the crown land portion includes an outer region disposed between the tire equator and the outer tread end, and an inner region disposed between the tire equator and the inner tread end, and a width, in the tire axial direction, of a ground contact surface of the outer region is greater than a width, in the tire axial direction, of a ground contact surface of the inner region.

[Disclosure 10]

In the tire according to disclosure 9, the crown land portion includes a plurality of first crown sipes extending from the inner crown circumferential groove and terminating in a ground contact surface of the crown land portion, and a plurality of second crown sipes extending from the outer crown circumferential groove and having end portions terminating in the ground contact surface of the crown land portion.

[Disclosure 11]

In the tire according to disclosure 1, the four circumferential grooves include an outer crown circumferential groove disposed adjacent to the inner tread end side of the outer middle land portion, and the outer middle sipes have end portions terminating in the outer middle land portion without reaching the outer crown circumferential groove.

[Disclosure 12]

In the tire according to disclosure 11, the outer middle land portion includes a plurality of terminating middle sipes, and the terminating middle sipes are connected to the outer crown circumferential groove and have end portions terminating in the outer middle land portion without reaching the outer shoulder circumferential groove.

[Disclosure 13]

In the tire according to disclosure 11 or 12, the outer middle land portion includes one outer middle circumferential sipe extending continuously in the tire circumferential direction.

[Disclosure 14]

In the tire according to any one of disclosures 11 to 13, each of the outer shoulder sipes and the outer middle sipes has a chamfered portion at at least one of sipe edges on both sides, and a maximum depth of the chamfered portion of each outer middle sipe is greater than a maximum depth of the chamfered portion of each outer shoulder sipe.

[Disclosure 15]

In the tire according to any one of disclosures 1 to 14, wherein the outer shoulder sipes and the outer middle sipes are inclined relative to the tire axial direction in opposite directions.

[Disclosure 16]

In the tire according to any one of disclosures 1 to 15, wherein the outer shoulder sipes extend from the outer shoulder circumferential groove at a first angle relative to the tire axial direction radial direction, wherein the outer middle sipes extend from the outer shoulder circumferential groove at a second angle relative to the tire axial direction, and wherein the second angle is greater than the first angle.

[Disclosure 17]

In the tire according to any one of disclosures 1 to 16, wherein a longitudinal length of the outer shoulder sipes is greater than a width of the outer shoulder sipes in the tire circumferential direction at the outer shoulder circumferential groove.

[Disclosure 18]

In the tire according to any one of disclosures 1 to 17, wherein the outer shoulder land portion comprises a plurality of outer shoulder lateral grooves, and wherein the outer shoulder sipes and the outer shoulder lateral grooves are inclined relative to the tire axial direction in a same direction.

[Disclosure 19]

In the tire according to any one of disclosures 1 to 18, wherein each of the outer middle sipes includes a constant width portion and a middle tire bar, and wherein in a cross-sectional view of each of the outer middle sipes the constant width portion overlaps the middle tire bar.

The tire of the present disclosure has the above-described structure, and, therefore, steering stability and noise performance can be enhanced.

What is claimed is:

1. A tire comprising:
a tread portion having a designated mounting direction to a vehicle,
wherein the tread portion comprises an outer tread end located on an outer side of the vehicle when the tire is mounted to the vehicle, an inner tread end located on an inner side of the vehicle when the tire is mounted to the vehicle, four circumferential grooves extending continuously in a tire circumferential direction between the outer tread end and the inner tread end, and five land portions demarcated by the four circumferential grooves, wherein the four circumferential grooves comprise an outer shoulder circumferential groove closest to the outer tread end when the tire is mounted to the vehicle, wherein the five land portions comprise an outer shoulder land portion including the outer tread end, and an outer middle land portion adjacent to the outer shoulder land portion via the outer shoulder circumferential groove, wherein the outer shoulder land portion has a greatest width, in a tire axial direction, of a ground contact surface among the five land portions, wherein the outer shoulder land portion comprises a plurality of outer shoulder sipes connected to the outer shoulder circumferential groove, wherein the outer middle land portion comprises a plurality of outer middle sipes connected to the outer shoulder circumferential groove, wherein each of the outer shoulder sipes and the outer middle sipes comprises a pair of sipe walls, wherein each of the outer shoulder sipes and the outer middle sipes comprises a body portion in which the pair of sipe walls are disposed substantially parallel to each other, wherein a width of the body portion of each outer shoulder sipe is greater than a width of the body portion of each outer middle sipe, wherein a maximum depth of each said outer shoulder sipe is greater than a maximum depth of each said outer middle sipe, wherein the outer shoulder sipes extend from the outer shoulder circumferential groove at a first angle relative to the tire axial direction radial direction, wherein the outer middle sipes extend from the outer shoulder circumferential groove at a second angle relative to the tire axial direction, and wherein the second angle is greater than the first angle, wherein the outer middle sipes extend completely across the outer middle land portion in the tire axial direction, and each have a chamfered portion at at least one of sipe edges on both sides, and wherein the chamfered portion of each said outer middle sipe has a minimum chamfered width at a position distant from circumferential edges on both sides of the outer middle land portion and has a chamfered width that increases from a position having the minimum chamfered width toward both the sides in the tire axial direction.

2. The tire according to claim 1, wherein the outer middle sipes extend completely across the outer middle land portion in the tire axial direction.

3. The tire according to claim 1, wherein each said outer shoulder sipe has an end portion terminating in the outer shoulder land portion without reaching the outer tread end.

4. The tire according to claim 1,
wherein each said outer shoulder sipe has a chamfered portion at at least one of sipe edges on both sides, and
wherein the chamfered portion of each said outer shoulder sipe has a width that increases toward the outer shoulder circumferential groove.

5. The tire according to claim 1, wherein the outer shoulder sipes and the outer middle sipes are inclined relative to the tire axial direction in opposite directions.

6. The tire according to claim 1, wherein a longitudinal length of the outer shoulder sipes is greater than a width of the outer shoulder sipes in the tire circumferential direction at the outer shoulder circumferential groove.

7. The tire according to claim 1,
wherein the outer shoulder land portion comprises a plurality of outer shoulder lateral grooves, and
wherein the outer shoulder sipes and the outer shoulder lateral grooves are inclined relative to the tire axial direction in a same direction.

8. The tire according to claim 1,
wherein each of the outer middle sipes includes a constant width portion and a middle tire bar, and
wherein in a cross-sectional view of each of the outer middle sipes the constant width portion overlaps the middle tire bar.

9. The tire according to claim 1,
wherein the four circumferential grooves further comprise an inner shoulder circumferential groove closest to the inner tread end when the tire is mounted to the vehicle,
wherein the five land portions comprise an inner shoulder land portion including the inner tread end, and an inner middle land portion adjacent to the inner shoulder land portion via the inner shoulder circumferential groove,
wherein the inner shoulder land portion comprises a plurality of inner shoulder sipes connected to the inner shoulder circumferential groove,
wherein the inner middle land portion comprises a plurality of inner middle sipes extending completely across the inner middle land portion in the tire axial direction,
wherein each of the inner shoulder sipes and the inner middle sipes comprises a pair of sipe walls,
wherein each of the inner shoulder sipes and the inner middle sipes comprises a body portion in which the pair of sipe walls are disposed substantially parallel to each other, and
wherein a width of the body portion of each inner shoulder sipe is greater than a width of the body portion of each inner middle sipe.

10. The tire according to claim 9, wherein each said inner shoulder sipe extends beyond the inner tread end.

11. The tire according to claim 1,
wherein the four circumferential grooves further comprise an outer crown circumferential groove and an inner crown circumferential groove disposed on both sides, respectively, of a tire equator,
wherein the five land portions further comprise a crown land portion demarcated between the outer crown circumferential groove and the inner crown circumferential groove,
wherein the crown land portion comprises an outer region disposed between the tire equator and the outer tread end, and an inner region disposed between the tire equator and the inner tread end, and
wherein a width, in the tire axial direction, of a ground contact surface of the outer region is greater than a width, in the tire axial direction, of a ground contact surface of the inner region.

12. The tire according to claim 11, wherein the crown land portion comprises a plurality of first crown sipes extending from the inner crown circumferential groove and terminating in a ground contact surface of the crown land portion, and a plurality of second crown sipes extending from the outer crown circumferential groove and having end portions terminating in the ground contact surface of the crown land portion.

13. The tire according to claim 1,
wherein the four circumferential grooves further comprise an outer crown circumferential groove adjacent to the inner tread end side of the outer middle land portion, and
wherein the outer middle sipes have end portions terminating in the outer middle land portion without reaching the outer crown circumferential groove.

14. The tire according to claim 13,
wherein the outer middle land portion comprises a plurality of terminating middle sipes, and
wherein the terminating middle sipes are connected to the outer crown circumferential groove and have end portions temlinating in the outer middle land portion without reaching the outer shoulder circumferential groove.

15. The tire according to claim 13,
wherein the outer middle land portion comprises one outer middle circumferential sipe extending continuously in the tire circumferential direction.

16. The tire according to claim 13,
wherein each of the outer shoulder sipes and the outer middle sipes has a chamfered portion at at least one of sipe edges on both sides, and
wherein a maximum depth of the chamfered portion of each said outer middle sipe is greater than a maximum depth of the chamfered portion of each said outer shoulder sipe.

17. A tire comprising:
a tread portion having a designated mounting direction to a vehicle,
wherein the tread portion comprises an outer tread end located on an outer side of the vehicle when the tire is mounted to the vehicle, an inner tread end located on an inner side of the vehicle when the tire is mounted to the vehicle, four circumferential grooves extending continuously in a tire circumferential direction between the outer tread end and the inner tread end, and five land portions demarcated by the four circumferential grooves,
wherein the four circumferential grooves comprise an outer shoulder circumferential groove closest to the outer tread end when the tire is mounted to the vehicle,
wherein the five land portions comprise an outer shoulder land portion including the outer tread end, and an outer middle land portion adjacent to the outer shoulder land portion via the outer shoulder circumferential groove,
wherein the outer shoulder land portion has a greatest width, in a tire axial direction, of a ground contact surface among the five land portions,
wherein the outer shoulder land portion comprises a plurality of outer shoulder sipes connected to the outer shoulder circumferential groove,
wherein the outer middle land portion comprises a plurality of outer middle sipes connected to the outer shoulder circumferential groove,
wherein each of the outer shoulder sipes and the outer middle sipes comprises a pair of sipe walls,
wherein each of the outer shoulder sipes and the outer middle sipes comprises a body portion in which the pair of sipe walls are disposed substantially parallel to each other,
wherein a width of the body portion of each outer shoulder sipe is greater than a width of the body portion of each outer middle sipe,
wherein each said outer shoulder sipe has an end portion terminating in the outer shoulder land portion without reaching the outer tread end,
wherein the four circumferential grooves further comprise an inner shoulder circumferential groove closest to the inner tread end when the tire is mounted to the vehicle,
wherein the five land portions comprise an inner shoulder land portion including the inner tread end, and an inner middle land portion adjacent to the inner shoulder land portion via the inner shoulder circumferential groove,
wherein the inner shoulder land portion comprises a plurality of inner shoulder sipes connected to the inner shoulder circumferential groove,
wherein the inner middle land portion comprises a plurality of inner middle sipes extending completely across the inner middle land portion in the tire axial direction,
wherein each of the inner shoulder sipes and the inner middle sipes comprises a pair of sipe walls,
wherein each of the inner shoulder sipes and the inner middle sipes comprises a body portion in which the pair of sipe walls are disposed substantially parallel to each other,
wherein a width of the body portion of each inner shoulder sipe is greater than a width of the body portion of each inner middle sipe,
wherein each said inner shoulder sipe extends beyond the inner tread end,
wherein the outer shoulder sipes and the outer middle sipes are inclined relative to the tire axial direction in opposite directions,
wherein the outer shoulder sipes extend from the outer shoulder circumferential groove at a first angle relative to the tire axial direction radial direction,
wherein the outer middle sipes extend from the outer shoulder circumferential groove at a second angle relative to the tire axial direction,
wherein the second angle is greater than the first angle, and
wherein the outer middle land portion and the outer middle land portion are free of any grooves,
wherein the outer middle sipes extend completely across the outer middle land portion in the tire axial direction, and each have a chamfered portion at at least one of sipe edges on both sides, and
wherein the chamfered portion of each said outer middle sipe has a minimum chamfered width at a position distant from circumferential edges on both sides of the outer middle land portion and has a chamfered width that increases from a position having the minimum chamfered width toward both the sides in the tire axial direction.

18. A tire comprising:
a tread portion having a designated mounting direction to a vehicle,
wherein the tread portion comprises an outer tread end located on an outer side of the vehicle when the tire is mounted to the vehicle, an inner tread end located on an inner side of the vehicle when the tire is mounted to the vehicle, four circumferential grooves extending continuously in a tire circumferential direction between the outer tread end and the inner tread end, and five land portions demarcated by the four circumferential grooves,
wherein the four circumferential grooves comprise an outer shoulder circumferential groove closest to the outer tread end when the tire is mounted to the vehicle, wherein the five land portions comprise an outer shoulder land portion including the outer tread end, and an outer middle land portion adjacent to the outer shoulder land portion via the outer shoulder circumferential groove, wherein the outer shoulder land portion has a greatest width, in a tire axial direction, of a ground contact surface among the five land portions, wherein the outer shoulder land portion comprises a plurality of outer shoulder sipes connected to the outer shoulder circumferential groove, wherein the outer middle land portion comprises a plurality of outer middle sipes connected to the outer shoulder circumferential groove, wherein each of the outer shoulder sipes and the outer middle sipes comprises a pair of sipe walls, wherein each of the outer shoulder sipes and the outer middle sipes comprises a body portion in which the pair of sipe walls are disposed substantially parallel to each other, wherein a width of the body portion of each outer shoulder sipe is greater than a width of the body portion of each outer middle sipe, wherein each said outer shoulder sipe has an end portion terminating in the outer shoulder land portion without reaching the outer tread end, wherein the four circumferential grooves further comprise an inner shoulder circumferential groove closest to the inner tread end when the tire is mounted to the vehicle, wherein the five land portions comprise an inner shoulder land portion including the inner tread end, and an inner middle land portion adjacent to the inner shoulder land portion via the inner shoulder circumferential groove, wherein the inner shoulder land portion comprises a plurality of inner shoulder sipes connected to the inner shoulder circumferential groove, wherein the inner middle land portion comprises a plurality of inner middle sipes extending completely across the inner middle land portion in the tire axial direction, wherein each of the inner shoulder sipes and the inner middle sipes comprises a pair of sipe walls, wherein each of the inner shoulder sipes and the inner middle sipes comprises a body portion in which the pair of sipe walls are disposed substantially parallel to each other, wherein a width of the body portion of each inner shoulder sipe is greater than a width of the body portion of each inner middle sipe, wherein the plurality of land portions comprises an inner shoulder land portion outward of the inner shoulder circumferential groove in a tire axial direction, and an outer shoulder land portion outward of the outer shoulder circumferential groove in the tire axial direction, wherein the inner shoulder land portion comprises a plurality of inner shoulder lateral grooves and a plurality of inner shoulder sipes, wherein each said inner shoulder lateral groove extends from an inner end located between the inner tread end and the inner shoulder circumferential groove beyond the inner tread end, wherein each said inner shoulder sipe extends from the inner shoulder circumferential groove beyond the inner tread end, wherein the outer shoulder land portion comprises a plurality of outer shoulder lateral grooves and a plurality of outer shoulder sipes, wherein each said outer shoulder lateral groove extends from the outer shoulder circumferential groove beyond the outer tread end, wherein each said outer shoulder sipe extends from the outer shoulder circumferential groove and has a terminating end between the outer shoulder circumferential groove and the outer tread end, wherein each said inner shoulder lateral groove has a first end that ends in the inner shoulder land portion and an auxiliary sipe extends from the first end of the inner shoulder lateral groove and contacts the inner shoulder circumferential groove, wherein each said outer shoulder lateral groove contacts the outer shoulder circumferential groove, wherein the inner shoulder lateral grooves and the inner shoulder sipes alternate in the tire circumferential direction, and wherein the outer shoulder lateral grooves and the outer shoulder sipes alternate in the tire circumferential direction, wherein the outer middle sipes extend completely across the outer middle land portion in the tire axial direction, and each have a chamfered portion at at least one of sipe edges on both sides, and wherein the chamfered portion of each said outer middle sipe has a minimum chamfered width at a position distant from circumferential edges on both sides of the outer middle land portion and has a chamfered width that increases from a position having the minimum chamfered width toward both the sides in the tire axial direction.

* * * * *